US012655290B2

(12) United States Patent
Yang et al.

(10) Patent No.: US 12,655,290 B2
(45) Date of Patent: Jun. 16, 2026

(54) RESIN COMPOSITION

(71) Applicant: LG Energy Solution, Ltd., Seoul (KR)

(72) Inventors: Young Jo Yang, Daejeon (KR); Do Yeon Kim, Daejeon (KR); Jeong Hyun Lee, Daejeon (KR); Yang Gu Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 603 days.

(21) Appl. No.: 18/027,772

(22) PCT Filed: Sep. 28, 2021

(86) PCT No.: PCT/KR2021/013199
§ 371 (c)(1),
(2) Date: Mar. 22, 2023

(87) PCT Pub. No.: WO2022/071713
PCT Pub. Date: Apr. 7, 2022

(65) Prior Publication Data

US 2023/0340256 A1 Oct. 26, 2023

(30) Foreign Application Priority Data

Sep. 29, 2020 (KR) ........................ 10-2020-0126958

(51) Int. Cl.

| | |
|---|---|
| ***C08L 67/04*** | (2006.01) |
| ***C08K 3/22*** | (2006.01) |
| ***H01M 50/204*** | (2021.01) |
| ***H01M 50/222*** | (2021.01) |
| ***H01M 50/227*** | (2021.01) |
| ***H01M 50/229*** | (2021.01) |

(52) U.S. Cl.
CPC ................ *C08L 67/04* (2013.01); *C08K 3/22* (2013.01); *H01M 50/204* (2021.01); *H01M 50/222* (2021.01); *H01M 50/227* (2021.01); *H01M 50/229* (2021.01); *C08K 2003/2227* (2013.01)

(58) Field of Classification Search
CPC .... H01M 50/227; H01M 50/229; C08L 67/04
See application file for complete search history.

(56) References Cited

U.S. PATENT DOCUMENTS

| | | | | |
|---|---|---|---|---|
| 9,890,276 | B2 | 2/2018 | Su | |
| 2004/0077773 | A1 | 4/2004 | Tavares et al. | |
| 2020/0212375 | A1* | 7/2020 | Lee | C08K 9/08 |
| 2020/0277432 | A1 | 9/2020 | Park et al. | |
| 2020/0277434 | A1* | 9/2020 | Cho | C08G 18/4269 |
| 2022/0006137 | A1* | 1/2022 | Ganapatibhotla | B32B 27/12 |

FOREIGN PATENT DOCUMENTS

| | | | | |
|---|---|---|---|---|
| CN | 106883724 | A * | 6/2017 | C09D 5/033 |
| JP | 2007277469 | A | 10/2007 | |
| JP | 2011074340 | A | 4/2011 | |
| JP | 2013227501 | A | 11/2013 | |
| JP | 2014032966 | A | 2/2014 | |
| JP | 2017057322 | A | 3/2017 | |
| JP | 6137607 | B2 | 5/2017 | |
| KR | 20100065731 | A | 6/2010 | |
| KR | 20190113585 | A | 10/2019 | |
| KR | 20200003442 | A | 1/2020 | |
| KR | 20200044789 | A | 4/2020 | |
| WO | 2020100102 | A2 | 5/2020 | |

OTHER PUBLICATIONS

International Search Report for PCT/KR2021/013199 mailed Jan. 18, 2022. 3 pgs.
Extended European Search Report including Written Opinion for Application No. 21875988.4 dated Jan. 25, 2024, pp. 1-8.
Evonik: "POLYVEST MA 75 Maleinsaureanhydrid-funktionalisiertes Fliissigpolybutadien", Aug. 2011 (Aug. 2011), pp. 1-2, XP093120312, Retrieved from the Internet: <URL:https://products.evonik.com/assets/88/69/TDS_POLYVEST_MA_75_DE_DE_Asset_1218869.pdf> [retrieved on Jan. 16, 2024] * the whole document *.

* cited by examiner

*Primary Examiner* — Jonathan G Jelsma
(74) *Attorney, Agent, or Firm* — Lerner David LLP

(57) ABSTRACT

The present application relates to a resin composition comprising a polymer compound having an organic acid anhydride functional group, a two-component resin composition, and a battery module comprising the same. In the present application, it is possible to provide a resin composition in which a uniform mixing state can be maintained without any oil separation phenomenon and the like even in the composition in which a filler is blended, and there is no viscosity increase even when stored for a long period of time. In addition, the present application can provide a two-component resin composition comprising the resin composition, and a battery module comprising the resin composition or the two-component resin composition.

17 Claims, No Drawings

RESIN COMPOSITION

CROSS-REFERENCE TO RELATED APPLICATIONS

The present application is a national stage entry under 35 U.S.C. § 371 of International Application No. PCT/KR2021/013199 filed on Sep. 28, 2021, which claims priority from Korean Patent Application No. 10-2020-0126958 filed on Sep. 29, 2020, all the disclosures of which are incorporated herein by reference.

TECHNICAL FIELD

The present application relates to a resin composition having improved storage safety.

BACKGROUND ART

A TIM (thermal interface material) material is usually prepared by blending a filler with a resin component.

Such a TIM material may be used in various applications, including battery modules and battery packs, and the like applied to electric vehicles.

As a resin component forming the TIM material, an epoxy resin component, a polyurethane resin component or a polysilicon component, and the like is generally used.

However, the resin components as above have a problem of poor storage stability or storage stability in common.

For example, in the case of the epoxy resin component, an amide compound is usually used as a curing agent, where the amide compound reacts with moisture to rapidly increase the viscosity of the material. In addition, when materials of aliphatic series are applied, there is also a problem that impurities such as salts are generated on the surface during long-term storage.

In the case of a material of polyurethane series, an isocyanate compound is mainly used as a curing agent, and such a compound also easily reacts with moisture to cause a viscosity increase in the material.

In the case of a material of polysilicon series, it has poor miscibility with generally applied fillers, whereby the oil separation phenomenon, in which the filler and the resin component are separated, easily occurs, and it comprises a low molecular weight siloxane component, thereby easily causing contact failure issues and the like when applied to electrical products.

In the case of the filler included in the TIM material, it usually contains moisture itself in many cases, where the moisture contained in the filler in this way speeds up the above problems.

In addition, depending on the use of the TIM material, an excessive amount of filler is often blended in order to obtain high thermal conductivity, where the use of an excessive amount of filler makes it more difficult to solve the above problems.

DISCLOSURE

Technical Problem

The present application provides a resin composition. The present application is intended to provide a resin composition that a uniform mixing state can be maintained without any oil separation phenomenon and the like even in a composition in which a filler is blended, and there is no viscosity increase even when stored for a long period of time.

The present application is intended to provide a resin composition capable of achieving the above object even when it contains an excessive amount of a filler in a state that particularly contains moisture and has not undergone a separate surface treatment.

Technical Solution

Among the physical properties mentioned in this specification, when the measured temperature affects the result, the relevant physical property is a physical property measured at room temperature, unless otherwise specified. The term room temperature is a natural temperature without warming or cooling, which is usually one temperature within the range of about 10° C. to 30° C., or a temperature of about 23° C. or about 25° C. or so. In addition, unless otherwise specified in this specification, the unit of temperature is ° C.

Among the physical properties mentioned in this specification, when the measured pressure affects the result, the relevant physical property is a physical property measured at normal pressure, unless otherwise specified. The term normal pressure is a natural pressure without pressurization and depressurization, where about 1 atmosphere or so is usually referred to as the normal pressure.

The present application relates to a resin composition used as a TIM (thermal interface material) material. The TIM (thermal interface material) material can be prepared by blending a filler with a resin component, and an epoxy resin component, a polyurethane resin component or a polysilicon component, and the like can be generally used as the resin component forming such a TIM material. However, the resin components as above have poor storage stability or keeping stability in common. In particular, when the filler is included in the TIM material, it usually contains moisture itself in many cases, where the moisture contained in the filler in this way may further deteriorate the storage stability or keeping safety, and the like of the resin composition.

The resin composition according to the present application comprises a polymer compound having an organic acid anhydride functional group and a filler. When the resin composition comprises a polymer compound having an organic acid anhydride functional group, it is possible to effectively prevent the resin composition from reacting with moisture to increase the viscosity. The moisture reacting with the resin composition may mean moisture existing outside the resin composition, moisture included in the resin composition, or moisture included in the filler.

As one example, the resin composition may satisfy the following general formula 1.

$$V=V_2/V_1<1.2 \quad \text{[General Formula 1]}$$

In General Formula 1, V is a viscosity change rate of a resin composition, $V_1$ is an initial viscosity measured at room temperature and a shear rate of 2.4/s using Wells/Brookfield Cone & Plate's viscometer within 3 minutes from the time of preparing a resin composition comprising a polymer compound having an organic acid anhydride functional group and a filler, and $V_2$ is a viscosity measured at room temperature and a shear rate of 2.4/s using Wells/Brookfield Cone & Plate's viscometer at the time of curing for 30 days from the time of preparing the resin composition.

In General Formula 1 above, the resin composition may be prepared by blending a filler with a polymer compound having an organic acid anhydride functional group and mixing them with a mixer.

As another example with regard to the measurement of $V_1$ in General Formula 1 above, it may be a viscosity measured within about 2.5 minutes or within about 2 minutes from the time of preparing the resin composition.

As another example, the viscosity change rate (V) of the resin composition in General Formula 1 above may be about 1.19 or less, 1.18 or less, 1.17 or less, 1.16 or less, or about 1.15 or less. The lower limit is not particularly limited, but may be about 1.00 or more, or more than about 1.00.

As one example, the organic acid anhydride functional group may be a functional group derived from benzoic anhydride, a functional group derived from phthalic anhydride or a functional group derived from maleic anhydride. The resin composition comprising the polymer compound having an organic acid anhydride functional group of the above type has a low reaction with moisture, so that it may effectively prevent the viscosity increase of the resin composition, and it may be advantageous to satisfy the aforementioned general formula 1.

As one example, the polymer compound is not particularly limited as long as it satisfies physical properties (molecular weight, glass transition temperature) to be described below, which may be, for example, a compound having an organic acid anhydride functional group substituted in a polybutadiene skeleton, a polyester skeleton or a polyether skeleton.

As one example, the polymer compound having the organic acid anhydride functional group may have a molecular weight (Mn) of 4,000 g/mol or less. As another example, the molecular weight (Mn) may be about 3,800 g/mol or less, 3,600 g/mol or less, 3,400 g/mol or less, 3,200 g/mol or less, or about 3,000 g/mol or less, and may be about 500 g/mol or more, 600 g/mol or more, 700 g/mol or more, 800 g/mol or more, 900 g/mol or more, or about 1,000 g/mol or more.

A resin composition comprising a polymer compound having a molecular weight (Mn) exceeding 4,000 g/mol may have poor storage stability due to a high viscosity change rate, and may cause overload of the injection equipment when mixed with a main part to be described below and applied to a battery module or battery pack. Meanwhile, a resin composition comprising a polymer compound having a molecular weight (Mn) of less than 500 g/mol has a very low viscosity, so that it takes a long time for the resin composition to cure, and thus the productivity of the battery module or battery pack to which the resin composition is applied may be lowered.

A resin composition comprising a polymer compound having a molecular weight (Mn) in the above range may be more advantageous in satisfying the above-mentioned general formula 1 because it has low reactivity with moisture, may prevent overload of the injection equipment when mixed with the main part and applied to a battery module or battery pack, and may also improve the productivity of battery modules or battery packs.

In this specification, the "molecular weight" may be a number average molecular weight (Mn) measured using GPC (gel permeation chromatograph).

With regard to the measurement of the number average molecular weight, it can be measured using GPC under the following conditions, where Agilent system's standard polystyrene can be used to prepare the calibration curve, thereby converting the measurement result.

Molecular Weight Measurement Conditions>

- Meter: Gel Permeation Chromatography (Waters Alliance System)
- Column: PL Mixed B type
- Detector: Refractive index detector
- Column flow rate and solvent: 1 mL/min, Solvent: THF (tetrahydrofuran)
- Analytical temperature and measurement volume: 40° C., 200 μL As one example, the polymer compound having the organic acid anhydride functional group may have a glass transition temperature of 0° C. or less. In another example, it may be about −5° C. or less, about −10° C. or less, about −15° C. or less, about −20° C. or less, about −25° C. or less, about −30° C. or less, about −35° C. or less, about −40° C. or less, about −45° C. or less, or about −50° C. or less, and may be about −150° C. or more, −140° C. or more, −130° C. or more, −120° C. or more, or about −100° C. or more. The glass transition temperature may be measured using a DMA (dynamic mechanical analyzer) or differential scanning calorimetry (DSC), and the like.

A resin composition comprising a polymer compound having a glass transition temperature satisfying the above range may be more advantageous in satisfying the above-mentioned general formula 1 because it has low reactivity with moisture.

As one example, the polymer compound may have an acid value according to DIN EN ISO 2114 in the range of 50 mgKOH/g to 120 mgKOH/g. In another example, the acid value may be about 52 mgKOH/g or more, 54 mgKOH/g or more, 56 mgKOH/g or more, 58 mgKOH/g or more, or about 60 mgKOH/g or more, and may be about 118 mgKOH/g or less, 116 mgKOH/g or less, 114 mgKOH/g or less, 112 mgKOH/g or less, or about 110 mgKOH/g or less.

The resin composition including the polymer compound satisfying the acid value in the above range has low reactivity with water, so that it may effectively prevent the viscosity increase of the resin composition, and it may be more advantageous to satisfy the above-mentioned general formula 1.

As one example, the polymer compound may comprise a polymerization unit of Formula 1 below.

[Formula 1]

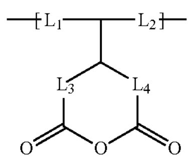

In Formula 1, $L_1$ is a single bond or an alkenylene group with 2 to 4 carbon atoms, $L_2$ is a single bond or an alkylene group with 1 to 4 carbon atoms, and $L_3$ and $L_4$ are each independently a single bond or an alkylene group with 1 to 4 carbon atoms.

In addition, the polymer compound may further comprise a polymerization unit of Formula 2 below.

[Formula 2]

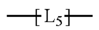

In Formula 2, $L_5$ is an alkenylene group with 2 to 4 carbon atoms or an alkylene group with 1 to 4 carbon atoms substituted with an alkenyl group with 2 to 4 carbon atoms.

The polymer compound comprising the polymerization unit of Formula 1 and the polymerization unit of Formula 2 has low reactivity with water, so that it may more effectively prevent the viscosity increase of the resin composition, and may be more advantageous in satisfying the aforementioned general formula 1.

The resin composition according to the present application comprises a filler. The filler may be a thermally conductive filler. In the present application, the term thermally conductive filler may mean a filler made of a material having a thermal conductivity of about 3 W/mK or more, 5 W/mK or more, 10 W/mK or more, or about 15 W/mK or more. Specifically, the thermal conductivity of the thermally conductive filler may be about 400 W/mK or less, 350 W/mK or less, or about 300 W/mK or less. The type of the usable thermally conductive filler is not particularly limited, but may be an inorganic filler when considering insulation and the like together. For example, ceramic particles such as aluminum oxide (alumina: $Al_2O_3$), aluminum nitride (AlN), boron nitride (BN), silicon nitride ($Si_3N_4$), silicon carbide (SiC) beryllium oxide (BeO), zinc oxide (ZnO), magnesium oxide (MgO) or boehmite may be used. The shape or ratio of the filler is not particularly limited, which may be appropriately adjusted in consideration of the viscosity of the resin composition, or the viscosity change rate, dispersibility or storage stability, and the like of the resin composition. In general, as the size of the filler increases, the viscosity of the composition comprising the same increases, and the sedimentation possibility of the filler increases. Also, the smaller the size, the higher the thermal resistance tends to be. Therefore, in consideration of such points, a filler of an appropriate type and size may be selected, and if necessary, two or more fillers may also be used together. In addition, it is advantageous to use a spherical filler in consideration of the amount to be filled, but a filler having a needle shape or a plate shape may also be used in consideration of network formation or conductivity, and the like.

In one example, the filler may have an average particle diameter in a range of about 0.001 μm to 80 μm. In another example, the average particle diameter of the filler may be about 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or about 5 μm or less.

In order to obtain excellent heat dissipation performance, it may be considered that a high content of the thermally conductive filler is used. The filler used in the high content may be included in a range of 75 weight % to 92 weight %, relative to 100 weight % of the resin composition. Specifically, the content of the filler may include about 76 weight % or more, 77 weight % or more, 78 weight % or more, 79 weight % or more, or about 80 weight % or more, and may include about 91.5 weight % or less, 91 weight % or less, 90.5 weight % or less, or about 90 weight % or less, relative to 100 weight % of the resin composition. The desired physical properties such as thermal conductivity and storage stability may be secured within the ratio range of the filler.

In one example, the moisture content of the filler is not particularly limited, which may be, for example, about 10 ppm or more, about 100 ppm or more, or about 1,000 ppm or more, and may be about 3,000 ppm or less, 2,900 ppm or less, or about 2,800 ppm or less. The moisture content of the filler can be measured with a karl fishcer titrator (KR831) under the conditions of 10% relative humidity and a drift of 5.0 or less. At this time, the moisture content may be an average moisture content with respect to all fillers used in the resin composition.

The resin composition lowers the moisture content of the filler in order to lower the viscosity change rate by moisture, or has required a pretreatment process of the filler, such as surface treatment of the filler, in order to prevent oil separation from occurring. The resin composition comprising the polymer compound having an organic acid anhydride functional group according to the present application has low reactivity with moisture even when the moisture content contained in the filler is within the range of 10 ppm to 3,000 ppm, so that the viscosity change of the resin composition is not large, and thus the storage stability of the resin composition can be greatly improved. In addition, since the pretreatment process of the filler is not necessarily accompanied, the manufacturing cost can be reduced and it has an effect of improving the manufacturing processability.

In addition to the above, various types of fillers may be used. For example, in order to secure insulating properties of a cured product in which the resin composition is cured, the use of a carbon filler such as graphite may be considered. Alternatively, for example, a filler such as fumed silica, clay, calcium carbonate ($CaCO_3$), zinc oxide (ZnO) or aluminum hydroxide ($Al(OH)_3$) may be used. The type or content ratio of such a filler is not particularly limited, which may be selected in consideration of viscosity, viscosity change rate, sedimentation possibility, thixotropy, insulation, filling effects or storage stability, and the like of the resin composition.

As one example, the resin composition may not comprise an amine catalyst and an isocyanate compound. The amine catalyst may be exemplified by 2,4,6-tris(dimethylaminomethyl)phenol, N,N-dimethylpropionamide, imidazole, 1,4-diazabicyclo(2,2,2)octane, bis(2-dimethylaminoethyl)ether, trimethylaminoethylethanolamine, pentamethyldiethylenetriamine, N,N'-dimethylethanolamine, dimethylaminopropylamine, N-ethylmorpholine, N,N-dimethylaminoethylmorpholine, N,N-dimethylcyclohexylamine or 2-methyl-2-azanorbornene, and the like, but is not limited thereto. In addition, the type of the isocyanate compound is not particularly limited, which may be exemplified by a known aromatic isocyanate compound or non-aromatic isocyanate compound, and the like.

The polymer compound having an organic acid anhydride functional group may react with moisture in the presence of an amine catalyst, which may cause a viscosity increase of the resin composition. Therefore, the storage stability of the resin composition may be deteriorated. In addition, when the isocyanate compound is present in the resin composition, it may react with moisture to cause a viscosity increase of the resin composition as well.

When the resin composition does not comprise any amine catalyst and any isocyanate compound, the moisture reactivity of the resin composition is significantly lowered, so that the storage stability of the resin composition may be more improved.

The present application also relates to a two-component resin composition. The two-component resin composition according to the present application may comprise a main part including a main resin and a filler; and a curing agent part. Meanwhile, the curing agent part may mean the above-described resin composition, that is, the resin composition including a polymer compound having an organic acid anhydride functional group and a filler, and thus matters regarding the above-mentioned resin composition and components constituting the resin composition may be equally applied to the two-component resin composition.

As one example, the filler included in the main part may use the above-described thermally conductive filler.

As the main resin, a polyol resin may be used, and specifically, an ester polyol resin may be used. The ester polyol may have amorphousness or a polyol having sufficiently low crystallinity.

In this specification, the “amorphousness” means a case in which the crystallization temperature (Tc) and the melting temperature (Tm) are not observed in a DSC (differential scanning calorimetry) analysis to be described below. At this time, the DSC analysis may be performed within the range of −80 to 60° C. at a rate of 10° C./min, which may be made, for example, in a manner that the temperature is raised from 25° C. to 60° C. at the above rate, and then reduced to −80° C. again and raised to 60° C. again. In addition, here, the “sufficiently low crystallinity” means a case in which the melting point (Tm) observed in the DSC analysis is less than 15° C., which is about 10° C. or less, 5° C. or less, 0° C. or less, −5° C. or less, −10° C. or less, or about −20° C. or less or so. At this time, the lower limit of the melting point is not particularly limited, but the melting point may be, for example, about −80° C. or more, −75° C. or more, or about −70° C. or more. When the polyol has crystallinity or strong (room temperature) crystallinity such as the case that the melting point range is not satisfied, the viscosity difference according to the temperature is likely to increase, so that the manufacturing processability may be deteriorated.

In one example, as the ester polyol, for example, a carboxylic acid polyol or a caprolactone polyol may be used.

The carboxylic acid polyol may be formed by reacting components comprising a carboxylic acid and a polyol (e.g., a diol or a triol, etc.), and the caprolactone polyol may be formed by reacting components comprising caprolactone and a polyol (e.g., a diol or a triol). At this time, the carboxylic acid may be a dicarboxylic acid.

The main part and the curing agent part may react at room temperature to be cured. Specifically, the ester polyol resin in the main part and the polymer compound having an organic acid anhydride functional group in the curing agent part may react at room temperature to be cured.

The curing reaction may be assisted by, for example, a catalyst. Accordingly, the two-component resin composition may include all states that the main resin (polyol) and the curing agent (polymer compound having an organic acid anhydride functional group) are separated, mixed, or reacted.

With regard to the catalyst, an amine catalyst may be used as a catalyst capable of accelerating the reaction between the main resin and the curing agent. For example, at least one of 2,4,6-tris(dimethylaminomethyl)phenol, N,N-dimethylpropionamide, imidazole, 1,4-diazabicyclo(2,2,2)octane, bis(2-dimethylaminoethyl)ether, trimethylaminoethylethanolamine, pentamethyldiethylenetriamine, N,N'-dimethylethanolamine, dimethylaminopropylamine, N-ethylmorpholine, N,N-dimethylaminoethylmorpholine, N,N-dimethylcyclohexylamine or 2-methyl-2-azanorbornene may be used.

The catalyst may be included in the main part in a range of about 0.01 weight % to 5 weight % relative to 100 weight % of the two-component resin composition. When the catalyst is included in the main part within the above range, it is advantageous to improve the storage stability of the two-component resin composition. In addition, when the two-component resin composition is injected, the two-component resin composition has a low viscosity, so that the manufacturing processability can be improved, and after injection, the curing rate of the two-component resin composition is accelerated, so that the process tact time of the battery module can be improved.

The two-component resin composition may further comprise a dispersant in at least one of the main part or the curing agent part. As the type of dispersant, a copolymer phosphoric acid-based dispersant containing a propylene glycol methyl ether group may be used in consideration of the desired viscosity and storage stability of the resin composition. Meanwhile, as one example, when the dispersant comprises both the main part and the curing agent part, regarding the content of the dispersant, the dispersant included in the main part may be included in the range of 0.05 weight % to 10 weight % relative to 100 weight % of the two-component resin, and the dispersant included in the curing agent part may be included in the range of 0.01 weight % to 5 weight % relative to 100 weight % of the two-component resin.

When such a phosphoric acid-based dispersant is used in the above-described content ratio in the main part and the curing agent part, the viscosity change of the two-component resin composition can be lowered and the oil separation can be more effectively prevented.

As one example, the two-component resin composition may form a cured product having a thermal conductivity of 2.0 W/mK or more as measured according to ISO22007-2 standard. As another example, it may be about 2.5 W/mK or more, 3.0 W/mK or more, 3.5 W/mK or more, or 4.0 W/mK or more, and may be about 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK. When the cured product of the two-component resin composition satisfies the thermal conductivity within the above range, the heat dissipation performance of the battery module or battery pack to which the two-component resin composition is applied may be improved.

The present application may also relate to a battery module. The battery module comprises a module case and a battery cell present inside the module case. The battery cell may be accommodated in the module case. One or more battery cells may exist in the module case, and a plurality of battery cells may be accommodated in the module case. The number of battery cells accommodated in the module case is not particularly limited as it is adjusted according to the use or the like. The battery cells accommodated in the module case may be electrically connected to each other.

The battery module according to the present application also comprises a resin layer in contact with the plurality of battery cells and the module case. The resin layer may be a cured layer of the above-described resin composition comprising the polymer compound having the organic acid anhydride functional group and the filler, or the cured layer of the above-described two-component resin composition.

The present application also relates to a battery pack, for example, a battery pack comprising two or more battery modules as described above. In the battery pack, the battery modules may be electrically connected to each other. A method of configuring a battery pack by electrically connecting two or more battery modules is not particularly limited, and any known method may be applied.

Advantageous Effects

The resin composition according to the present application can maintain a uniform mixing state without any oil separation phenomenon even in the composition in which a filler is blended, and can prevent or reduce viscosity increase even during long-term storage. In addition, the resin composition according to the present application may achieve the above effects even when it comprises an excessive amount of a filler in a state in which it contains moisture and is not subjected to a separate surface treatment.

MODE FOR INVENTION

Hereinafter, the present application will be described in detail through Examples, but the scope of the present application is not limited by the Examples below.

Storage Stability Evaluation

Storage stability evaluation was performed using the curing agent part (resin composition) prepared in Examples and Comparative Examples. When the value of the following general formula 1 was 1.2 or more, it was assumed that there was no storage stability.

$$V=V_2/V_1<1.2 \quad \text{[General Formula 1]}$$

In General Formula 1, V is a viscosity change rate of a resin composition, $V_1$ is an initial viscosity measured at room temperature and a shear rate of 2.4/s using Wells/Brookfield Cone & Plate's viscometer within 3 minutes from the time of preparing a resin composition comprising a polymer compound having an organic acid anhydride functional group and a filler, and $V_2$ is a viscosity measured at room temperature and a shear rate of 2.4/s using Wells/Brookfield Cone & Plate's viscometer at the time of curing for 30 days from the time of preparing the resin composition.

In addition, it was determined that there was no storage stability even when white crystals were formed due to salt generation or oil separation was observed within 3 days from the time the resin composition was prepared.

[Evaluation Criteria]

O: The value of General Formula 1 above is less than 1.2, no salt generation, no oil separation phenomenon is observed within 3 days (if all are applicable)

X: The value of General Formula 1 above is 1.2 or more, salt generation presence, oil separation phenomenon is observed within 3 days (if any of these is applicable)

Thermal Conductivity

It was measured by a hot disk method according to ISO22007-2 standard using a cured product of a two-component resin composition prepared from the main part and the curing agent part prepared in Examples and Comparative Examples by means of a static mixer. At this time, the two-component resin composition was prepared so that the volume ratio of the main part and the curing agent part was 1:1 or so.

Specifically, regarding the thermal conductivity measurement, the thermal conductivity can be measured in the through plane direction by placing the cured product of the two-component resin composition in a mold having a thickness of about 5 mm or so and using a hot disk device. As stipulated in the above standard (ISO 22007-2), the hot disk device is a device that can identify the thermal conductivity by measuring the temperature change (electrical resistance change) as a sensor with a nickel wire of a double spiral structure is heated, and such a thermal conductivity was measured according to the standard.

Example

Main Part:

As the main resin, a caprolactone polyol represented by the following formula 3 was used.

[Formula 3]

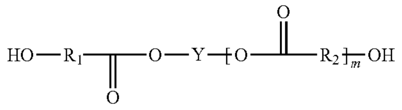

In Formula 3, m is a number within a range of 1 to 3, $R_1$ and $R_2$ are each alkylene with 4 carbon atoms, and Y is a unit derived from 1,4-butanediol unit.

As a filler, alumina was used, and one without any treatment on the particle surface was used as it was.

Daejungchem's DMP-30 (2,4,6-tris(dimethylaminomethyl)phenol) was used as a catalyst, and BYK's BKY-111 was used as a dispersant.

The main part was prepared by mixing the caprolactone polyol, the filler, the catalyst and the dispersant in a weight ratio of 10.36:89:0.34:0.3 (polyol: filler: catalyst: dispersant).

Curing Agent Part (Resin Composition):

As a polymer compound having an organic acid anhydride functional group, EVONIK's POLYVEST MA 75 was used (number average molecular weight: 3,000 g/mol, glass transition temperature: −95° C., acid value: 70-90 mgKOH/g).

As a filler, alumina was used, and one without any treatment on the particle surface was used as it was.

As a dispersant, BYK's BKY-118 was used.

The curing agent part was prepared by mixing the polymer compound having the organic acid anhydride functional group, the filler and the dispersant in a weight ratio of 10.85:89:0.15 (polymer compound: filler: dispersant).

The mixing during the preparation of the main part and the curing agent part was performed with a planetary mixer.

Comparative Example 1

Main part: It was prepared by mixing the same components in the same ratios as in Example, except that a tin catalyst (Sigma-Aldrich's DBTDL) was used instead of the amine catalyst.

Curing agent part: It was prepared by mixing the same components in the same ratios as in Example, except that a polyisocyanate (HDI, hexamethylene diisocyanate) was used instead of the polymer compound of Example and as the dispersant, BYK's BKY-111 was used.

Comparative Example 2

Main part: It was prepared by mixing the same components in the same ratios as in Example, except that an epoxy resin (Kukdo Chemical's YH-300) was used instead of the polyol resin as the main resin and as the dispersant, BYK's BKY-102 was used.

Curing agent part: It was prepared by mixing the same components in the same ratios as in Example, except that an amide (Kukdo Chemical's G-A0432) was used instead of the polymer compound of Example and as the dispersant, BYK's BKY-102 was used.

Comparative Example 3

Main part: It was prepared by mixing the same components in the same ratios as in Comparative Example 2.

Curing agent part: It was prepared by mixing the same components in the same ratios as in Example, except that an aliphatic amine (Kukdo Chemical' KH-8108) was used instead of the polymer compound of Example and as the dispersant, BYK's BKY-102 was used.

Comparative Example 4

Main part: It was prepared by mixing the same components in the same ratios as in Example, except that as the main resin, siloxane (KCC's SF3000E, SF6003P, Modifier715 and Inhibitor600) was used and as the dispersant, BYK's BYK-1799 was used.

Curing agent part: It was prepared by mixing the same components in the same ratios as in Example, except that siloxane (KCC's SF3000E) was used instead of the polymer compound of Example and as the dispersant, BYK's BYK-1799 was used.

The storage stability evaluation and thermal conductivities measured for Example and Comparative Examples were summarized and described in Table 1 below.

TABLE 1

| | Storage stability | Thermal conductivity (W/mK) |
|---|---|---|
| Example | ○ | 2.6 |
| Comparative Example 1 | X (viscosity increase more than twice for 1 month) | 2.8 |
| Comparative Example 2 | X (viscosity increase 1.5 times or more for 1 month) | 3.0 |
| Comparative Example 3 | X (white crystal generation due to salt generation) | 3.0 |
| Comparative Example 4 | X (oil separation after 3 days) | 2.6 |

From the results in Table 1, in the case of Example comprising the polymer compound having an organic acid anhydride functional group in the resin composition, it can be seen that it has excellent storage stability even without performing the moisture content control of the filler or the surface treatment of the filler. In addition, the cured product of the two-component resin composition comprising the resin composition in the curing agent part had an excellent thermal conductivity of 2.0 W/mK or more.

In comparison, in the case of Comparative Example 1 comprising the isocyanate instead of the polymer compound having an organic acid anhydride functional group in the resin composition or in the case of Comparative Example 2 comprising the amide instead of the polymer compound having an organic acid anhydride functional group in the resin composition, it can be seen that the viscosity change rate exceeds 1.2, whereby the storage stability is deteriorated. Also, in the case of Comparative Example 3 comprising the aliphatic amine instead of the polymer compound having an organic acid anhydride functional group in the resin composition, white crystals were produced due to salt generation. In addition, in the case of Comparative Example 4 comprising the siloxane instead of the polymer compound having an organic acid anhydride functional group in the resin composition, it can be seen that the oil separation phenomenon is observed within 3 days from the time the resin composition is prepared, whereby the storage stability is deteriorated.

The invention claimed is:

1. A two-component resin composition, comprising:

a curing agent part comprising a polymer compound having an organic acid anhydride functional group and a first filler; and a main part including a main resin and a second filler, wherein the curing agent part does not comprise an isocyanate group, and at least one of the curing agent part or the main part further comprises a copolymer phosphoric acid-based dispersant containing a propylene glycol methyl ether group.

2. The two-component resin composition according to claim 1, wherein the organic acid anhydride functional group is a functional group derived from benzoic anhydride, a functional group derived from phthalic anhydride or a functional group derived from maleic anhydride.

3. The two-component resin composition according to claim 1, wherein the polymer compound has an organic acid anhydride functional group substituted in a polybutadiene skeleton, a polyester skeleton or a polyether skeleton.

4. The two-component resin composition according to claim 1, wherein the polymer compound has a number average molecular weight (Mn) of 500 g/mol to 4,000 g/mol.

5. The two-component resin composition according to claim 1, wherein the polymer compound has a glass transition temperature (Tg) of −150° C. to 0° C.

6. The two-component resin composition according to claim 1, wherein the polymer compound has an acid value according to DIN EN ISO 2114 in a range of 50 mgKOH/g to 120 mgKOH/g.

7. The two-component resin composition according to claim 1, wherein the polymer compound comprises a polymerization unit represented by Formula 1:

[Formula 1]

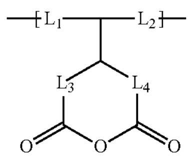

wherein, $L_1$ is a single bond or an alkenylene group with 2 to 4 carbon atoms, $L_2$ is a single bond or an alkylene group with 1 to 4 carbon atoms, and $L_3$ and $L_4$ are each independently a single bond or an alkylene group with 1 to 4 carbon atoms.

8. The two-component resin composition according to claim 1, wherein the polymer compound further comprises a polymerization unit represented by formula 2:

[Formula 2]

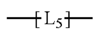

wherein, $L_5$ is an alkenylene group with 2 to 4 carbon atoms or an alkylene group with 1 to 4 carbon atoms substituted with an alkenyl group with 2 to 4 carbon atoms.

9. The two-component resin composition according to claim 1, wherein the first filler is included in a range of 75 weight % to 92 weight % relative to 100 weight % of the resin composition.

10. The two-component resin composition according to claim 1, wherein the first filler has a moisture content in a range of 10 ppm to 3,000 ppm.

11. The two-component resin composition according to claim 1, wherein the first filler is fumed silica, clay, calcium carbonate ($CaCO_3$), aluminum oxide ($Al_2O_3$), aluminum nitride (AlN), boron nitride (BN), silicon nitride ($Si_3N_4$), silicon carbide (SiC), beryllium oxide (BeO), zinc oxide (ZnO), aluminum hydroxide ($Al(OH)_3$), boehmite or a carbon filler.

12. The two-component resin composition according to claim 1, wherein the curing agent part does not comprise an amine catalyst or an isocyanate compound.

13. The two-component resin composition according to claim 1, wherein the main resin is a polyol resin.

14. The two-component resin composition according to claim 13, wherein the polyol resin is a carboxylic acid polyol or a caprolactone polyol.

15. The two-component resin composition according to claim 1, wherein the main part further comprises an amine catalyst.

16. The two-component resin composition according to claim 15, wherein the amine catalyst is included in the main part in a range of about 0.01 weight % to 5 weight % relative to 100 weight % of the two-component resin composition.

17. A battery module, comprising:

a module case;

a plurality of battery cells accommodated in an inner space of the module case; and a resin layer in contact with the plurality of battery cells and the module case, wherein the resin layer is a cured layer of the two-component resin composition of claim 1.

* * * * *